United States Patent [19]

Matsumura et al.

[11] Patent Number: 5,457,369
[45] Date of Patent: Oct. 10, 1995

[54] NUMERICAL CONTROL SYSTEM

[75] Inventors: Teruyuki Matsumura, Hachioji; Yuji Deguchi; Koichi Noda, both of Minamitsuru, all of Japan

[73] Assignee: Fanuc Ltd., Minamitsuru, Japan

[21] Appl. No.: 256,238

[22] PCT Filed: Oct. 26, 1993

[86] PCT No.: PCT/JP93/01548

§ 371 Date: Jul. 1, 1994

§ 102(e) Date: Jul. 1, 1994

[87] PCT Pub. No.: WO94/11796

PCT Pub. Date: May 26, 1994

[30] Foreign Application Priority Data

Nov. 11, 1992 [JP] Japan ................................. 4-300910

[51] Int. Cl.$^6$ ................................................. G05B 19/18
[52] U.S. Cl. .................. 318/569; 318/568.1; 364/474.15; 364/474.22
[58] Field of Search .................. 318/560, 561–565, 318/567, 568.1, 569, 590, 600–605; 364/180, 191–192, 193, 474.01, 474.02, 474.11, 474.12, 474.14, 474.15, 474.16, 474.22, 474.23

[56] References Cited

U.S. PATENT DOCUMENTS 4,706,002 11/1987 Fukuyama ........................... 318/568

FOREIGN PATENT DOCUMENTS 3-154105 7/1991 Japan .

*Primary Examiner*—David S. Martin
*Attorney, Agent, or Firm*—Staas & Halsey

[57] ABSTRACT

A numerical control system for readily finding machining programs containing desired machining steps and displaying the programs at a display device. A storage device stores machining programs and an internal table. A setting/registering unit creates the machining programs interactively in accordance with commands entered by an operator through an input device such as a keyboard, and registers the machining programs in the storage device with internal codes corresponding to the machining steps affixed thereto. When a command to perform a search for a specific machining step is entered by the operator, a command input unit requests the operator to enter a search start program number, a search end program number, etc., through the input device. On receiving the entered start program number, etc., a searching unit searches the machining programs, stored in the storage device, for the specific machining step, and outputs search data, whereupon a display control unit displays the search data at the display device.

8 Claims, 14 Drawing Sheets

```
100 MACHINING PROGRAM
101  N0001  O3336;
102  N0002  (TOKYO)
103  N0003  G90 X0. Y0. Z100.;
104  N0004  ZH03 Z10. P2. K3. T001;
105  N0005  ZH01 Z10. F20 S1000 T002;
106  N0006  ZH01 Z10. F10 S500 T003;
107  N0007  M02;
```

FIG. 3

200 INTERNAL TABLE

| MACHINING MENU | DETAILED MENU | INTERNAL CODE | |
| --- | --- | --- | --- |
| | | MACHINING MENU | DETAILED MENU |
| HOLE CUTTING (201) | DRILLING<br>BORING<br>TAPPING<br>REAMING<br>COUNTERBORING | Z H | 0 1<br>0 2<br>0 3<br>0 4<br>0 5 |
| SIDE CUTTING (202) | SQUARE CUT<br>CIRCULAR CUT<br>TRACK CUT<br>ONE-SIDE CUT | Z S | 0 1<br>0 2<br>0 3<br>0 4 |
| POCKET CUTTING (203) | SQUARE POCKET<br>CIRCULAR POCKET<br>TRACK POCKET<br>POLYGONAL POCKET | Z P | 0 1<br>0 2<br>0 3<br>0 4 |

43a DISPLAY SCREEN

PROGRAM LIST SCREEN

```
00001  00002  00003  00004  00005  00006  00007  00008  00009  00010
01001  01102  02303  02404  02765  03336  03567  03668  03899  04010
04561  04782  04993  05004  05005  05006  05557  05678  05999  06610
09001  09002  09003  09004
```

SEARCH START PROGRAM No.?    >  0 1 0 0 1

| CANCEL |
| 451 | 452 | 453 | 454 | 455 | 456 | 457 | 458 | 459 | 460 |

43a DISPLAY SCREEN

PROGRAM LIST SCREEN

| 00001 | 00002 | 00003 | 00004 | 00005 | 00006 | 00007 | 00008 | 00009 | 00010 |
| 01001 | 01102 | 02303 | 02404 | 02765 | 03336 | 03567 | 03668 | 03899 | 04010 |
| 04561 | 04782 | 04993 | 05004 | 05005 | 05006 | 05557 | 05678 | 05999 | 06610 |
| 09001 | 09002 | 09003 | 09004 |

```
START      01001
END        06610
MACHINING MENU
DETAILED MENU
```
300 WINDOW

MACHINING MENU TO BE SEARCHED? >

| HOLE | SIDE | POCKET |   |   |   |   |   |   |   |
|------|------|--------|---|---|---|---|---|---|---|
|CUTTING|CUTTING|CUTTING|  |   |   |   |   |   |   |

43a DISPLAY SCREEN

MACHINING MENU SEARCH SCREEN  PAGE: 01  MACHINING: HOLE CUTTING

| PROGRAM NO. | COMMENT | DETAILED MENU | TOOL NAME | TOOL DIAMETER |
|---|---|---|---|---|
| 01001 | S-10225 | TAPPING | TAP | 10.0 |
| 02404 | TEST3 | DRILLING | DRILL | 12.0 |
|  |  | TAPPING | TAP | 14.0 |
| 03336 | TOKYO | TAPPING | TAP | 5.0 |
|  |  | DRILLING | DRILL | 10.0 |
|  |  | DRILLING | DRILL | 12.0 |
| 04010 | LIMA01 | REAMING | REAMER | 20.0 |
| 04567 | LIMA53 | REAMING | REAMER | 25.0 |
| 04993 | BOL08 | REAMING | REAMER | 25.0 |
| 05004 | TOKYO2 | TAPPING | TAP | 8.0 |
|  |  | TAPPING | TAP | 10.0 |
| 06610 | S-10378 | TAPPING | TAP | 10.0 |

| PRO-GRAM LIST | | | MA-CHINING SEARCH | | | | | | |

451 452 453 454 455 456 457 458 459 460

45

5,457,369

NUMERICAL CONTROL SYSTEM

TECHNICAL FIELD

The present invention relates to a numerical control system, and more particularly, to a numerical control system for displaying machining steps at a display device in accordance with the operator's command.

BACKGROUND ART

In numerical control systems, an interactive-type automatic programming technique is widely used so that machining programs can be easily prepared in a short time. According to the interactive automatic programming procedure, the operator selects a menu screen displayed at a display device in accordance with a machining process, and then selects a menu item corresponding to a machining step, to thereby create a program. This procedure eliminates the need to use a complicated programming language such as an APT for preparing programs, thus permitting even an unskilled operator to create programs.

Machining programs thus created are stored in storage means such as a nonvolatile memory in the numerical control system. Accordingly, once a machining program is created, it can be fetched for use in another machining program. For example, if a hole-cutting program for cutting a hole according to a predetermined pattern is once created, it can be fetched and combined with another machining program to effect the same hole cutting. Thus, the collection of machining programs can be effectively used.

However, in cases where the number of created machining programs is large, each machining program must be selected and the contents thereof displayed, in order to examine whether the program contains a required machining step. Accordingly, finding a machining program containing a target machining step from among a large number of created machining programs is troublesome, requiring considerable labor and time.

DISCLOSURE OF THE INVENTION

The present invention takes into account the above circumstances, and an object thereof is to provide a numerical control system which can readily find a machining program containing a desired machining step and display the program at a display device.

To achieve the above object, the present invention provides a numerical control system capable of displaying a machining step at a display device, which comprises storage means for storing at least one machining program including internal codes and an internal table defining machining steps corresponding to the respective internal codes, setting/registering means for creating the machining program interactively in accordance with commands entered by an operator through an input device including a keyboard, and for registering the machining program in the storage means with the internal codes corresponding to the machining steps affixed to the machining program, command input means for requesting the operator to enter a search start program number and a search end program number through the input device when supplied with a command to carry out a search for a machining step, searching means for searching the machining program, stored in the storage means, for the machining step specified by the command, based on the search start program number and the search end program number, and outputting search data, and display control means for displaying the received search data at the display device.

The storage means stores at least one machining program and the internal table. The machining program is created according to an automatic programming procedure and contains internal codes representing machining steps. The internal table defines the internal codes and the machining steps.

The setting/registering means creates the machining program interactively in accordance with commands entered by the operator through an input device such as a keyboard, and registers the machining program in the storage means with internal codes corresponding to the machining steps affixed to the program.

When a command to carry out a search for a specific machining step is entered by the operator, the command input means requests the operator to enter a search start program number, a search end program number, etc., through the input device such as the keyboard. On receiving the entered start program number, etc., the searching means searches the machining program, stored in the storage means, for the specific machining step, and outputs search data. When supplied with the search data from the searching means, the display control means displays the search data at the display device.

BRIEF DESCRIPTION OF THE DRAWINGS

FIG. 3 is a diagram showing an example of a machining program;

FIG. 4 is a diagram showing an example of the arrangement of an internal table;

FIG. 6 is a diagram showing an example of another display screen;

FIG. 8 is a diagram showing an example of a further display screen;

FIG. 10 is a diagram showing an example of still another display screen;

BEST MODE OF CARRYING OUT THE INVENTION

An embodiment of the present invention will be described with reference to the drawings.

Figure 2:
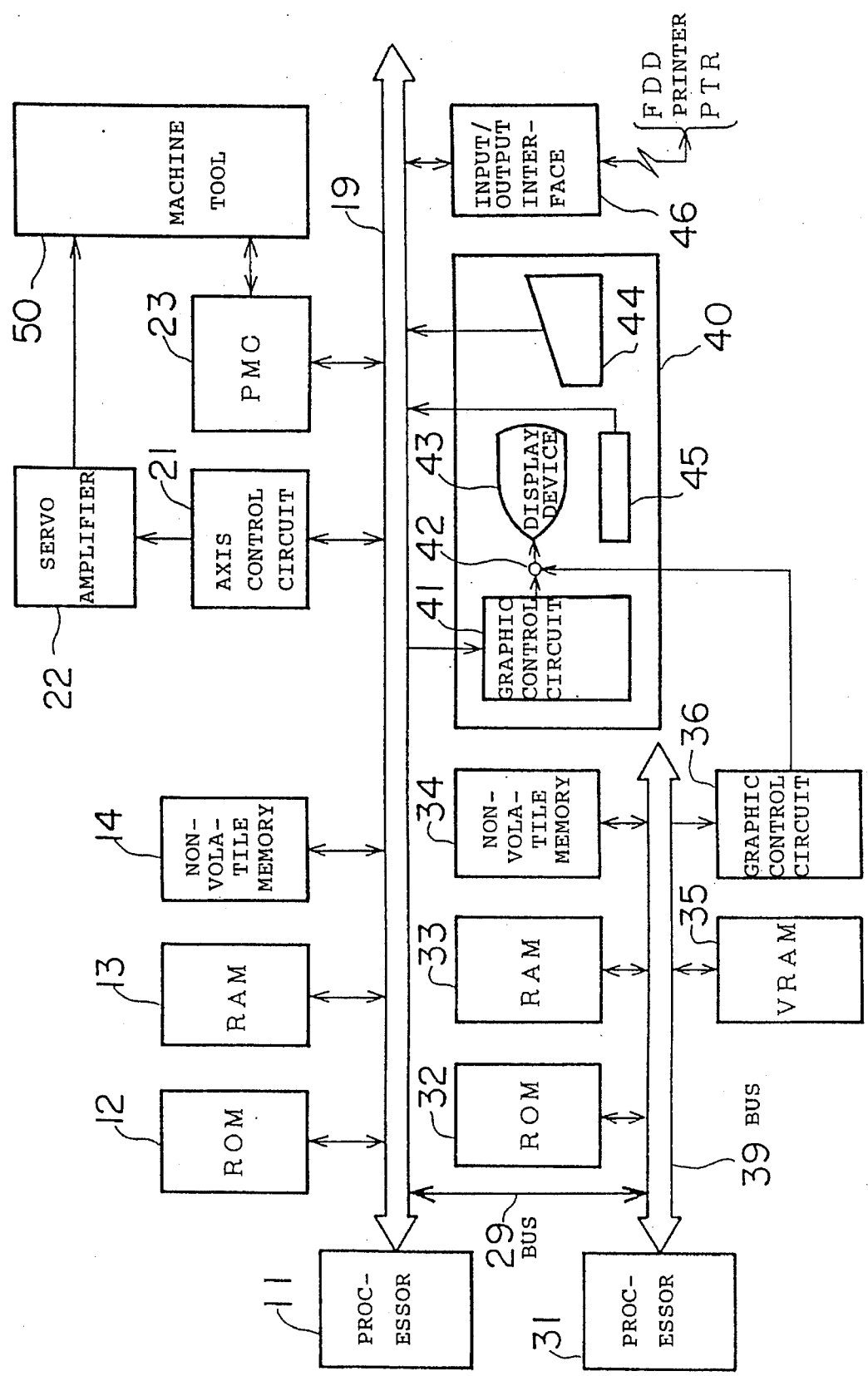
FIG. 2 is a block diagram illustrating the configuration of an interactive numerical control system.

FIG. 2 is a block diagram illustrating the configuration of an interactive numerical control system which is a kind of numerical control system for embodying the present invention.

A processor 11 globally controls the interactive numerical control system in accordance with system programs stored in a ROM 12. An EPROM or EEPROM is used for the ROM 12. A RAM 13 comprises an SRAM or the like, and stores various data or input/output signals. A nonvolatile memory 14 comprises a CMOS, which is backed up by a battery, not shown, and stores parameters, pitch error correction values, tool offset values and the like that should be retained even when the power supply is cut off.

An axis control circuit 21 is supplied with an axis move command from the processor 11, and outputs the axis command to a servo amplifier 22. On receiving the move command, the servo amplifier 22 drives a servomotor of a machine tool 50. A PMC (programmable machine controller) 23 is supplied with a T-function signal (tool select command), etc., when executing an NC program. In accordance with a sequence program, the PMC 23 processes the input signals and outputs the resultant signals as motion commands, to thereby control the machine tool 50. Also, the PMC 23 is supplied with a status signal from the machine tool 50, subjects the signal to sequential processing, and transfers the required signal to the processor 11.

The elements described above are interconnected by a bus 19. A processor 31 for an interactive mode, which is separate from the aforementioned NC processor (CPU) 11, is connected to the bus 19 via a bus 29.

The processor 31 is associated with a bus 39, to which are connected a ROM 32, a RAM 33, a nonvolatile memory 34, a VRAM (video RAM) 35, and a graphic control circuit 36. The processor 31 executes a program for interactive processing, stored in the ROM 32, and displays, in the form of a menu, tasks, data items or the like to be set, on an interactive data input screen displayed at a display device 43, as mentioned later. Further, the processor 31 creates a machining program based on the input data, and also displays paths of entire movement of tools, etc., by means of background animation. The ROM 32 stores, in addition to the interactive processing program, instruction data such as start program numbers, end program numbers, machining menus, detailed menus, etc., along with the aforesaid interactive data input screens. The RAM 33 comprises an SRAM or the like, and stores various data related to the interactive processing, etc. For the nonvolatile memory 34, a CMOS backed up by a battery, not shown, is used so as to store internal tables, program data, machining programs, etc., that should be retained even when the power supply is cut off. The VRAM 35 stores graphic data which is used when carrying out animated simulation of a machining operation of the machine tool 50 in accordance with the machining program stored in the nonvolatile memory 34 in the form of NC sentences. The graphic control circuit 36 converts the graphic data, stored in the VRAM 35, into display signals for output. A CRT/MDI (cathode ray tube/manual data input) panel 40 for man-machine interfacing is connected to the bus 19, and includes a graphic control circuit 41, a selector 42, the aforementioned display device 43, a keyboard 44, and software keys 45.

The graphic control circuit 41 converts digital signals, supplied from the processor 11, etc., into display signals and outputs the converted signals. The selector 42 allows the display signals from the graphic control circuit 36 or those from the graphic control circuit 41 to be supplied to the display device 43. For the display device 43, a CRT or liquid crystal display device is used. The keyboard 44 includes symbolic keys, numeric keys, etc., which permit entry of required figure data and NC data. The software keys 45 are command keys whose functions vary according to the system program etc., and the names or the like of their functions are displayed at predetermined positions on the screen of the display device 43.

When supplied with the display signals from the graphic control circuit 36, the display device 43 displays a background animation based on the program data processed and created by the interactive-mode processor 31. When supplied with the display signals from the graphic control circuit 41, on the other hand, the display device 43 displays geometrical figures, machining conditions, etc., while a machining program is prepared in interactive mode.

An input/output interface 46 is connected to the bus 19, for controlling the input/output of data including the NC data with respect to external equipment such as an FDD (floppy disk drive), a printer, and a PTR (paper tape reader).

The operation of the numerical control system according to the present invention will be now described.

Figure 1:
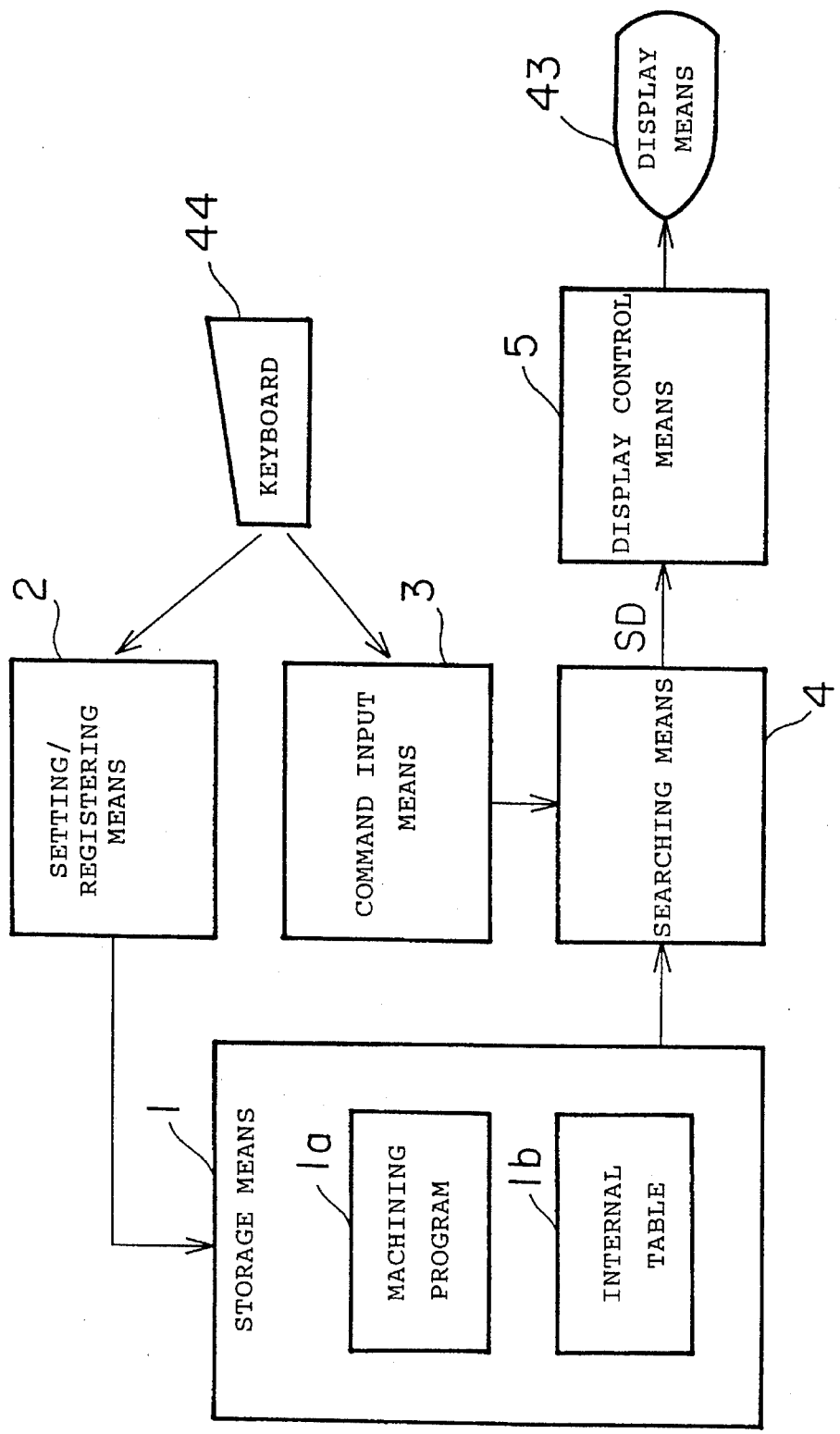
FIG. 1 is a diagram illustrating principles of the present invention.

FIG. 1 illustrates the principles of the present invention. As shown in the figure, the numerical control system of the present invention comprises several elements including storage means 1, setting/registering means 2, command input means 3, searching means 4, and display control means 5. The setting/registering means 2, the command input means 3 and the searching means 4 represent the functions which are achieved when the system programs stored in the ROM 12 (FIG. 2) are executed by the processor 11.

The storage means 1 corresponds to the nonvolatile memory 34 in FIG. 2, and stores one or more machining programs 1a and an internal table 1b. The machining program 1a is a program created according to the automatic programming procedure, and contains internal codes representing machining steps, as mentioned later. The internal table 1b defines the internal codes in relation to the machining menus and detailed menus representing machining steps, as described later.

The setting/registering means 2 interactively creates the machining program 1a in accordance with the operator's commands entered through an input device such as the keyboard, and stores the program in the storage means 1 while affixing thereto internal codes corresponding to the machining steps. Also, the setting/registering means 2 creates the internal table 1b in accordance with the operator's commands, and registers the created table in the storage means 1. Thus, the operator is allowed to manage the internal table 1b.

When a command to find a certain machining step is entered by the operator through the keyboard 44 as the input device, the command input means 3 prompts the operator to enter a start program number, an end program number, etc., via an input device such as the keyboard 44.

On receiving the start program number, etc., thus entered, the searching means 4 searches the machining programs 1a, stored in the storage means 1, for the machining step, and outputs search data SD in the form of a list which shows the machining programs identified by the search and the machining steps included therein. The display control means 5 corresponds to the graphic control circuit 36 in FIG. 2, and displays the search data SD at the display device 43 when supplied with the search data SD from the searching means 4.

Thus, the setting/registering means 2 stores the machining programs 1a in the storage means 1, with internal codes affixed thereto, in accordance with the operator's command entered from an input device such as the keyboard, the searching means 4 searches the machining programs 1a for a desired machining step in accordance with the operator's command supplied via the command input means 3, and the display control means 5 displays the search data at the display device 43, whereby the machining programs containing the desired machining step can be found easily. Consequently, time required for the preparation of machining programs can be shortened.

The machining program 1a will be now described in detail.

FIG. 3 illustrates an example of the machining program 1a. The illustrated program is a machining program 100 for carrying out drilling and tapping, and is stored in the storage means 1 by the setting/registering means 2, both shown in FIG. 1. In the figure, "N0001" to "N0007" denote sequence numbers of the machining program, and accordingly, a description thereof is omitted.

In this machining program 100, the program number "03336" is specified at line 101, comment "TOKYO" is specified at line 102, and movement to a machining start point is specified as "G90 X0.Y0.Z100." at line 103. At line 107, the program end is specified by "M02".

At line 104, hole cutting is first specified by "ZH" as a machining menu, and tapping is specified by "03" as a detailed menu. "Z10.P2.K3.T001" represents cycle machining parameters for carrying out the hole cutting.

Similarly, at each of lines 105 and 106, hole cutting is specified by "ZH" as the machining menu, and drilling is specified by "01" as the detailed menu. "Z10" and the subsequent items denote cycle machining parameters for carrying out the hole cutting.

The machining menus "ZH", the detailed menus "01", "03", etc., are stored in the storage means 1 as predetermined codes of binary format. This serves to reduce the memory capacity of the storage means 1 required for storing the machining program 100.

Details of the aforementioned internal table 1b will be now described.

FIG. 4 illustrates an example of the arrangement of the internal table 1b. The internal table 200 is a table which is referred to when a program is interactively entered according to the automatic programming procedure or when the operator enters a command to search a certain machining step, and is generally divided into three parts, i.e., a machining menu, a detailed menu, and an internal code.

In the left-hand column "MACHINING MENU" of the internal table 200, hole cutting, side cutting, and pocket cutting are specified at lines 201, 202 and 203, respectively.

The middle column "DETAILED MENU" indicates machining steps in relation to tools to be used in the respective machining menus. For example, for the "HOLE CUTTING" at line 201, drilling, boring, tapping, reaming, and counterboring are specified. For the "SIDE CUTTING" at line 202, square cutting, circular cutting, track cutting, and one-side cutting are specified. Similarly, for the "POCKET CUTTING" at line 203, square pocketing, circular pocketing, track pocketing, and polygonal pocketing are specified.

In the right-hand column are specified "INTERNAL CODES" corresponding to the respective machining menus and respective detailed menus. In connection with the machining menus, "ZH" is specified for the hole cutting at line 201, "ZS" is specified for the side cutting at line 202, and "ZP" is specified for the pocket cutting at line 203.

With regard to the detailed menus, for the hole cutting at line 201, for example, "01" is specified for drilling, "02" is specified for boring, "03" is specified for tapping, "04" is specified for reaming, and "05" is specified for counterboring. For the side cutting at line 202, "01" is specified for square cutting, "02" is specified for circular cutting, "03" is specified for track cutting, and "04" is specified for one-side cutting. Likewise, regarding the pocket cutting at line 203, "01" is specified for square pocketing, "02" is specified for circular pocketing, "03" is specified for track pocketing, and "04" is specified for polygonal pocketing.

"ZH", etc., of the machining menus and "01", "03", etc., of the detailed menus, specified in the internal table 200, are stored in the storage means 1 as predetermined codes in binary format. By doing this, the memory capacity of the storage means 1 required for storing the machining program 100 can be reduced.

The internal table 200 can also be created by the setting/registering means 2 and registered in the storage means 1, in accordance with the operator's command. Thus, the internal table 200 can be managed by means of data reflecting the operator's intention, as well as the internal codes.

The operation procedure followed by the operator and the contents of various display screens will be now described with reference to FIGS. 5 through 11.

Figure 5:
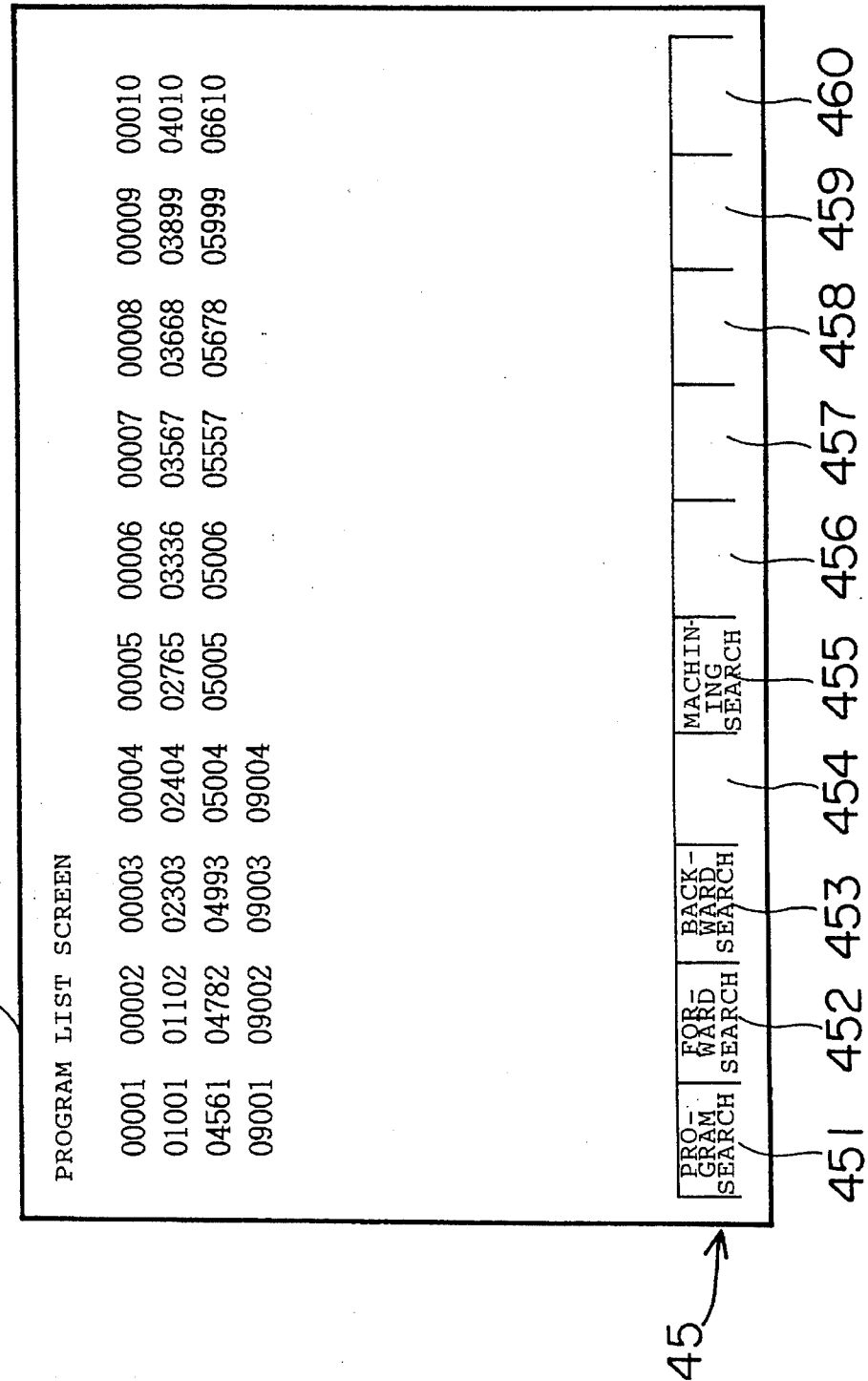
FIG. 5 is a diagram showing an example of a display screen.
Figure 7:
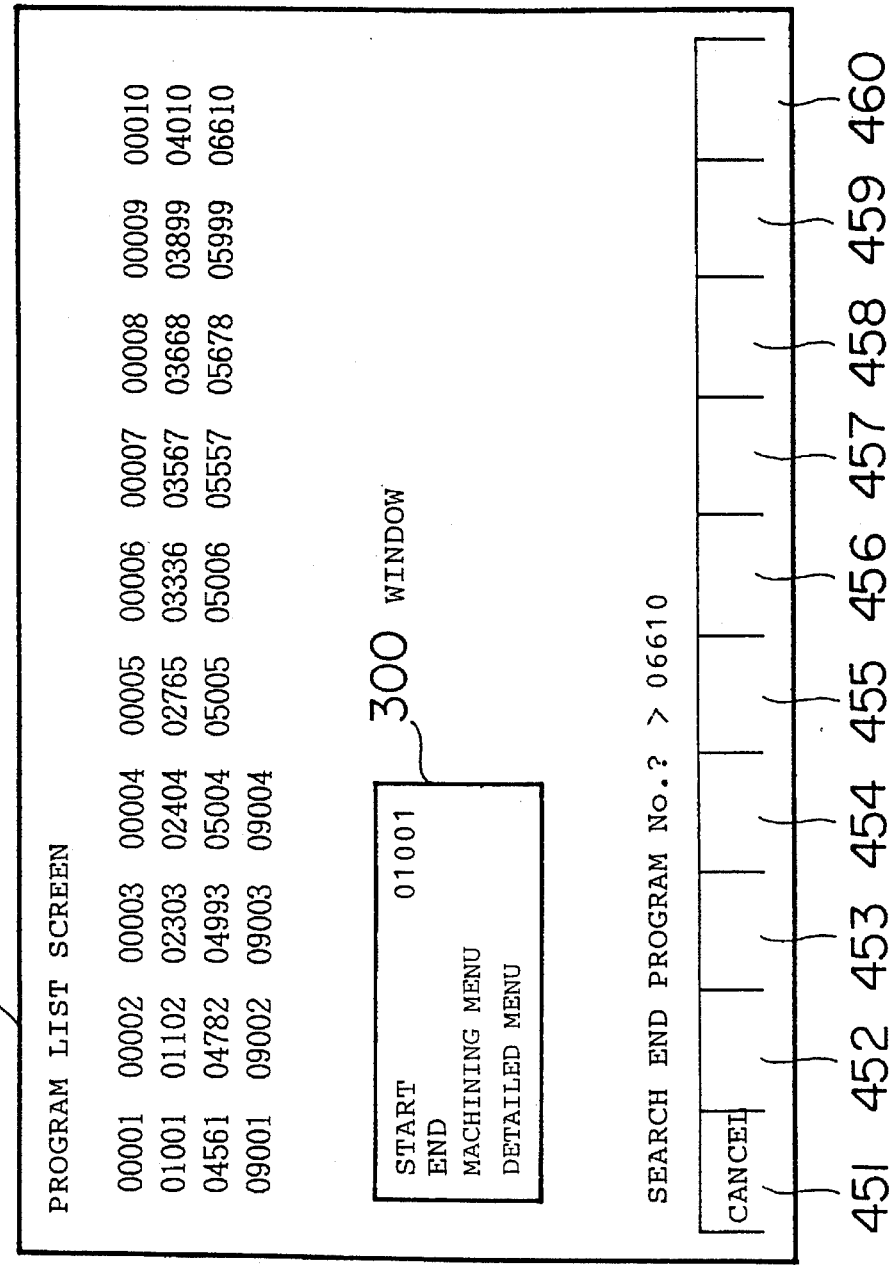
FIG. 7 is a diagram showing an example of still another display screen.
Figure 9:
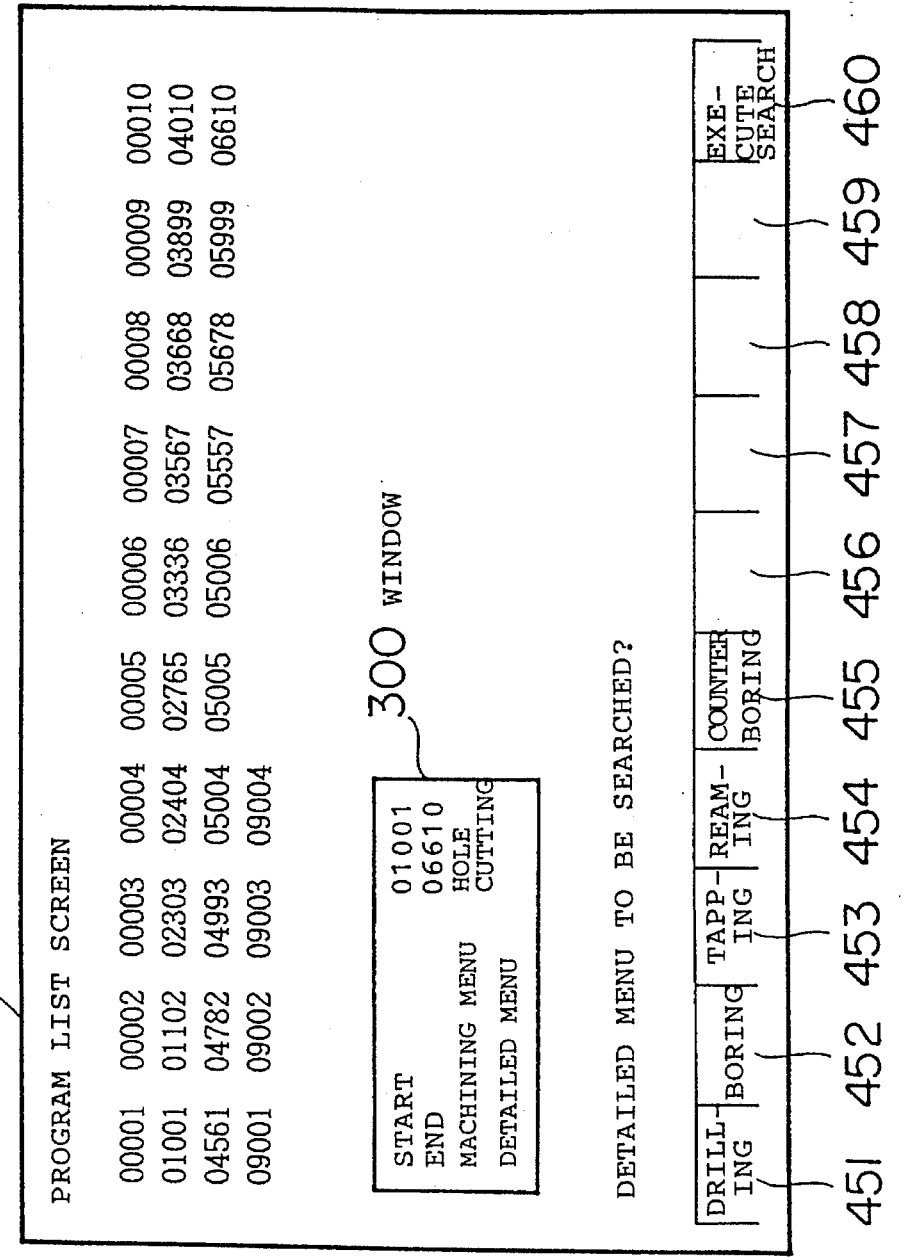
FIG. 9 is a diagram showing an example of another display screen.
Figure 11:
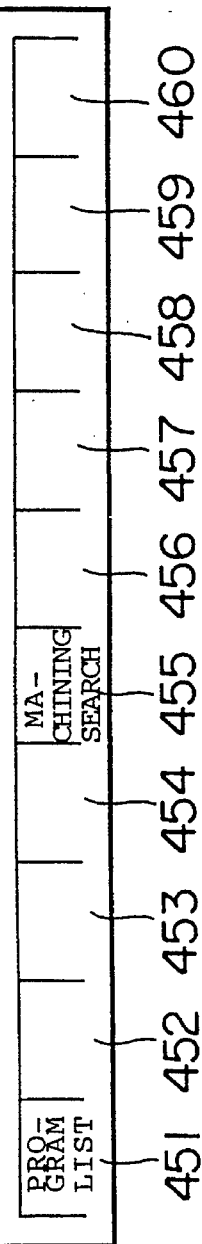
FIG. 11 is a diagram showing an example of a further display screen.

FIGS. 5 to 11 each illustrate an example of a display screen. FIG. 5 shows a program list screen, FIG. 6 shows a screen displayed after a "MACHINING SEARCH" key shown in FIG. 5 is pressed, FIG. 7 shows a screen displayed after a search start program number is entered, FIG. 8 shows a screen displayed after a search end program number is entered, FIG. 9 shows a screen displayed after a machining menu is set, FIG. 10 shows a screen displayed after a search is performed using "HOLE CUTTING" alone as a specified machining menu, and FIG. 11 shows a screen displayed after a search is performed using "TAPPING" as a specified detailed menu.

In FIGS. 5 to 11, a display screen 43a represents a screen displayed at the display device 43 shown in FIG. 2. At the bottom of the display screen 43a, the functions of the software keys 45 are indicated, the functions of command keys 451 to 460 being variable as the screen changes.

The program list screen shown in FIG. 5 is displayed when a predetermined operation is executed by the operator. As illustrated, the machining programs 1a stored in the storage means 1 (FIG. 1) are listed by the program number, i.e., 00001, 00002, . . . . If, in the screen of FIG. 5, the operator presses a "MACHINING SEARCH" key among the software keys 45, i.e., the command key 455, to perform a search for a specific machining step, the display screen changes to the screen shown in FIG. 6.

In the screen of FIG. 6, the message "SEARCH START PROGRAM NO.? >" is displayed at the lower part of the display screen 43a, thereby requesting the operator to specify the first program number to start the search, among the program numbers in the program list. In the figure, "01001" is entered by the operator in reply to the message. When a start program number is entered, the display screen changes to the screen shown in FIG. 7. To cancel the entry of the start program number, the command key 451 of the software keys 45 may be pressed.

In the screen shown in FIG. 7, a window 300 is displayed at the left-hand part of the display screen 43a, and "01001" is shown as the start program number in the window 300. The display position, contents, etc., of the window 300 are controlled by the display control means 5 shown in FIG. 1. Further, the message "SEARCH END PROGRAM NO.? >"

is displayed at the lower part of the display screen 43a, to request the operator to specify the last program number to be searched, among the program numbers in the program list. In the figure, "06610" is entered by the operator in reply to the message. When a search end program number is entered, the display screen changes to the screen shown in FIG. 8. To cancel the entry of the search end program number, the command key 451 of the software keys 45 may be pressed, as in the case of the screen shown in FIG. 6.

In the screen of FIG. 8, the search end program number "06610", in addition to the search start program numbers is shown in the window 300. Further, the message "MACHINING MENU TO BE SEARCHED? >" is displayed at the lower part of the display screen 43a, to request the operator to specify a machining menu as a machining step to be found. In reply to this message, the operator selects one of the command keys 451, 452 and 453 among the software keys 45, to specify hole cutting (451), side cutting (452), or pocket cutting (453). When the hole-cutting command key 451 is selected by the operator, the display screen changes to the screen shown in FIG. 9.

In the screen of FIG. 9, the machining menu "HOLE CUTTING", in addition to the search start program number and the search end program number, is shown in the window 300. Furthermore, the message "DETAILED MENU TO BE SEARCHED? >" is displayed at the lower part of the display screen 43a, to request the operator to specify a detailed menu as a machining step to be found. In reply to this message, the operator selects one of the command keys 451 to 455 among the software keys 45, to specify drilling (451), boring (452), tapping (453), reaming (454), or counterboring (455). In this case, if the operator presses a command key 460 to execute search, without specifying any detailed menu, the machining programs are searched only for the specified machining menu, and the display screen changes to the screen shown in FIG. 10. On the other hand, if the tapping command key 453 is selected, the machining programs are searched for both the machining menu and the detailed menu, and the display screen changes to the screen shown in FIG. 11.

The following is a description of the screens displayed by the display control means 5 in FIG. 1 after the search is performed by the searching means 4 following the above-described input operation.

The screen of FIG. 10 shows the result of the search performed in respect of the machining menu "HOLE CUTTING" specified in FIG. 8. The items displayed include the identified program numbers, comments, detailed menus, tool names, and tool diameters. These items are illustrated only by way of example, and other items such as NC sentences may be additionally displayed. To switch the screen to the program list screen shown in FIG. 5, the command key 451 of the software keys 45 has only to be pressed, and to perform a search for another machining menu or detailed menu, the command key 455 has only to be pressed.

Like the screen of FIG. 10, the screen of FIG. 11 shows the result of the search. This search, however, is conducted for both "HOLE CUTTING", specified in FIG. 8 as the machining menu, and "TAPPING", specified in FIG. 9 as the detailed menu.

Thus, interactive entry of search items is carried out by displaying messages which request the operator to specify program numbers to be searched and machining and detailed menus, and machining programs containing the specified machining steps are identified from among the machining programs 1a stored in the storage means 1, and then displayed on-screen. Accordingly, even an unskilled operator can easily perform a search, and time required for the preparation of machining programs is shortened.

Figure 12:
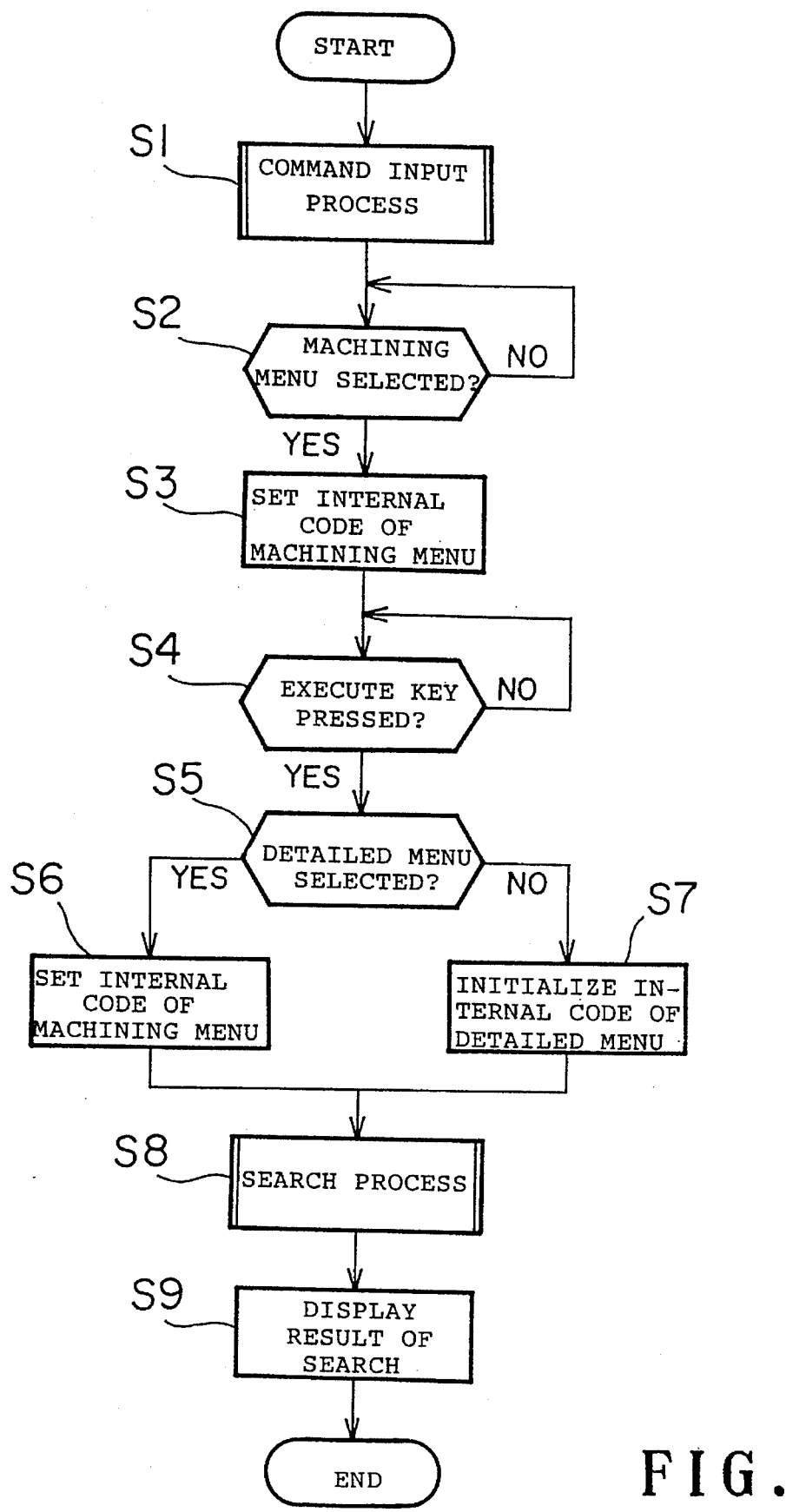
FIG. 12 is a flowchart showing an entire process for carrying out the present invention.

FIG. 12 is a flowchart of an entire process for carrying out the present invention. In this flowchart, Steps S1 to S7 are executed by the command input means 3 shown in FIG. 1, Step S8 is executed by the searching means 4, and Step S9 is executed by the display control means 5. In the chart, the numbers following "S" represent step numbers.

[S1] A command input process is executed. Specifically, a search start program number and a search end program number are entered or set, as described later with reference to FIG. 13.

[S2] It is determined whether a machining menu has been selected. If a machining menu has been selected (YES), the program proceeds to Step S3, and if no machining program is selected (NO), Step S2 is repeated.

[S3] An internal code corresponding to the machining menu is acquired. Specifically, the internal code corresponding to the machining menu selected in Step S2 is set.

[S4] It is determined whether an execute key has been pressed. If the execute key has been pressed (YES), the flow proceeds to Step S5, and if the execute key is not pressed yet (NO), Step S4 is repeatedly executed.

[S5] It is determined whether a detailed menu has been selected. If a detailed menu has been selected (YES), the program proceeds to Step S6, and if no detailed menu has been selected (NO), the program proceeds to Step S7.

[S6] An internal code corresponding to the detailed menu is set. More specifically, the internal code corresponding to the detailed menu selected in Step S5 is set. The program then proceeds to Step S8.

[S7] The internal code associated with the detailed menu is initialized. Specifically, "0" is set as the initial code for the detailed menu.

[S8] A search process is executed. Specifically, among the machining programs stored in the storage means 1, those containing the specified machining steps are identified based on the internal code of the machining menu, obtained in Step S3, and the internal code of the detailed menu, set in Step S6 or S7, as described later with reference to FIG. 14.

[S9] The result of the search is displayed. More specifically, the search data SD, which includes the program numbers of the machining programs identified in Step S8 and the comments, tool names, etc., in the identified programs, are displayed in a predetermined format at the display device 43 shown in FIG. 2. The process is then ended.

Figure 13:
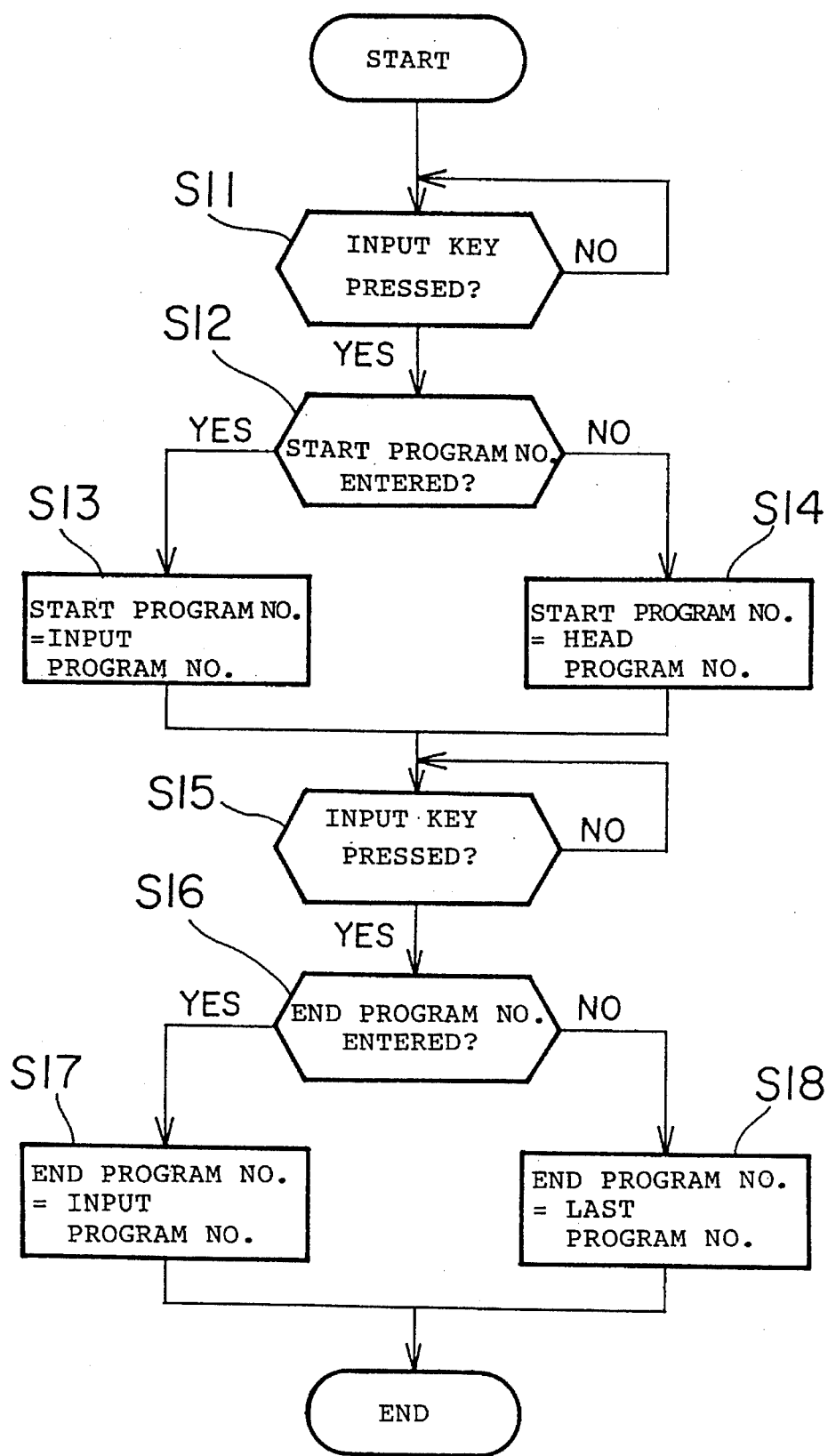
FIG. 13 is a flowchart showing the procedure of a command input process.

FIG. 13 is a flowchart illustrating how the command input process is executed. The process shown in this flowchart is executed by the command input means 3 in FIG. 1. In the chart, the numbers following "S" denote step numbers.

[S11] It is determined whether an "INPUT" key, which is one of the keys provided on the keyboard 44 (FIG. 2), has been pressed. If the "INPUT" key has been pressed (YES), the program proceeds to Step S12, and if the "INPUT" key is not pressed yet (NO), Step S11 is repeatedly executed.

[S12] It is determined whether a search start program number has been entered. Namely, it is determined whether a search start program number has been entered at the program list screen shown in FIG. 5. If a search start program number has been entered (YES), the flow proceeds to Step S13, and if no search start program number has been entered (NO), the flow proceeds to Step S14.

[S13] The program number entered in Step S12 is set as the search start program number.

[S14] A head program number, i.e., the program number which is displayed first in the program list screen, is set as the search start program number.

[S15] It is determined whether the "INPUT" key has been pressed, as in Step S11. If the "INPUT" key has been pressed (YES), the program proceeds to Step S16, and if the "INPUT" key has not yet been pressed (NO), Step S15 is repeatedly executed.

[S16] It is determined whether a search end program number has been entered. Namely, it is determined whether a search end program number has been entered at the program list screen shown in FIG. 6. If a search end program number has been entered (YES), the flow proceeds to Step S17, and if no search end program number has been entered (NO), the flow proceeds to Step S18.

[S17] The program number entered in Step S16 is set as the search end program number, and then the process is ended.

[S18] The last program number, i.e., the program number which is displayed last in the program list screen, is set as the search end program number, and then the process is ended.

Figure 14:
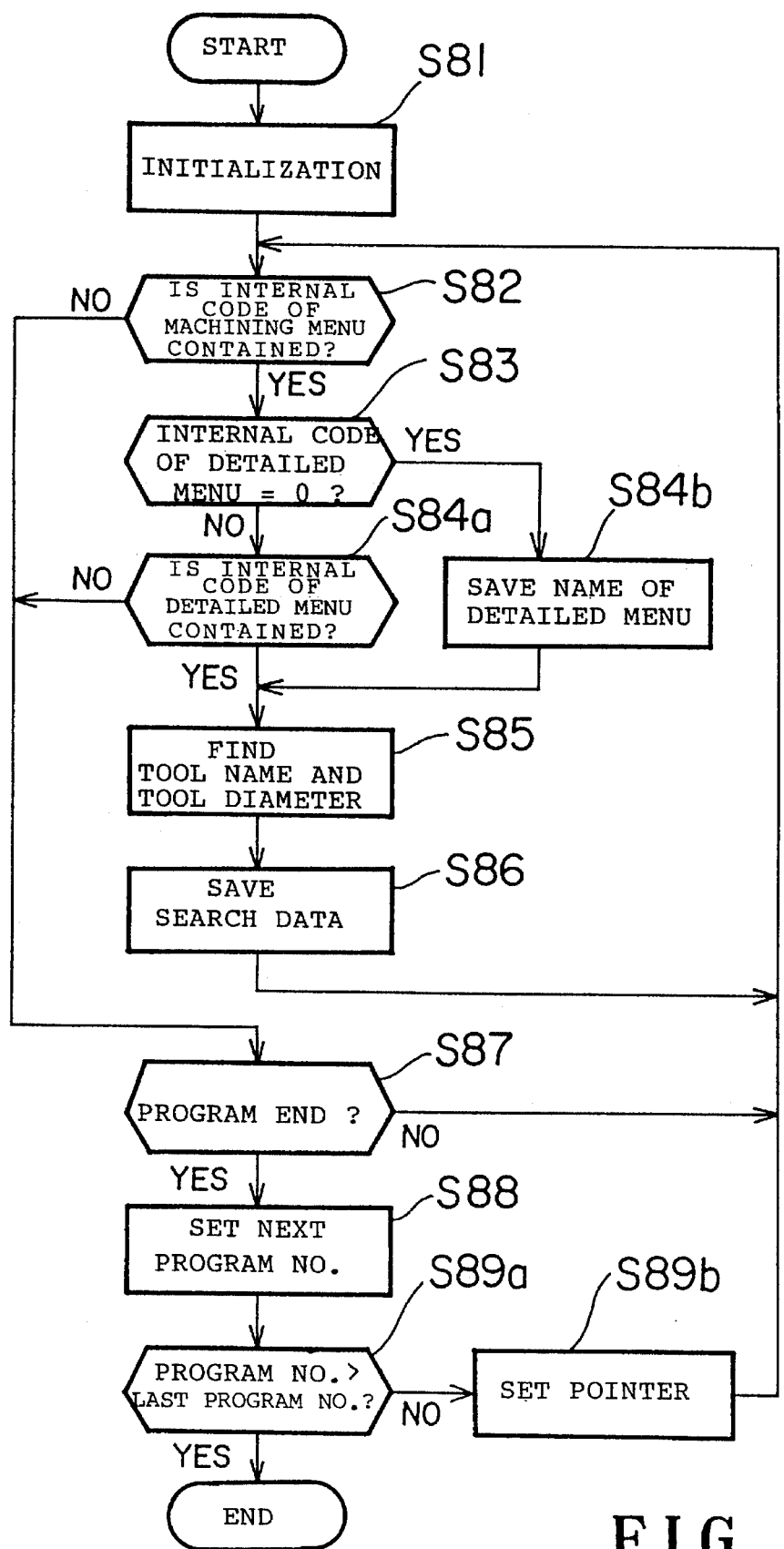
FIG. 14 is a flowchart showing the procedure of a search process.

FIG. 14 is a flowchart illustrating how the search process is executed. The process shown in this flowchart is executed by the searching means 4 in FIG. 1. In the chart, the numbers following "S" denote step numbers.

[S81] Initialization for the search process is carried out. Specifically, a search start pointer is set at the head position of the machining program which is specified by the search start program number entered in Step S13 or S14 of FIG. 13.

[S82] It is determined whether the internal code of the specified machining menu is contained in the machining program. More specifically, it is determined whether the internal code of the machining menu set in Step S3 of FIG. 12 is contained in the machining program. If the internal code of the machining menu is contained in the machining program (YES), the program proceeds to Step S83, and if the internal code is not contained in the machining program (NO), the program proceeds to Step S87.

[S83] It is determined whether the internal code of the detailed menu is "0". Specifically, it is determined whether the internal code of the detailed menu has been set to "0" in Step S6 or S7 of FIG. 12. If the internal code of the detailed menu is "0" (YES), the flow proceeds to Step S84b; if the internal code is not "0" (NO), the flow proceeds to Step S84a.

[S84a] It is determined whether the internal code of the detailed menu is contained in the machining program. More specifically, it is determined whether the internal code of the detailed menu set in Step S6 or S7 of FIG. 12 is contained in the machining program. If the internal code of the detailed menu is contained in the machining program (YES), the program proceeds to Step S85, and if the internal code is not contained in the machining program (NO), the program proceeds to Step S87.

[S84b] The name of the detailed menu is saved in a work area of the RAM 33 shown in FIG. 2. The program then proceeds to Step S85.

[S85] The name and diameter of the tool used are identified. Specifically, the name and diameter of the tool used are obtained from the machining program, based on the machining menu and detailed menu identified in Steps S82, S83 and S84a.

[S86] The search data SD obtained in Step S85 is saved in the work area of the RAM 33. The program then returns to Step S82.

[S87] It is determined whether the end of the machining program has been reached. If the end of the machining program has been reached (YES), the flow proceeds to Step S88; if the program end has not been reached (NO), the flow returns to Step S82.

[S88] Among the program numbers in the program list screen shown in FIG. 6, the program number of a machining program which is subsequent to the machining program on which the current cycle of search process has been performed is set.

[S89a] It is determined whether the program number set in Step S88 is greater than the search end program number set in Step S17 or S18 of FIG. 13. If the set program number is greater than the search end program number (YES), the process is ended; if not (NO), the flow proceeds to Step S89b.

[S89b] The pointer is set to a new position. Specifically, the search start pointer is set at the head position of the machining program which is specified by the program number set in Step S88.

Thus, based on the commands entered by the operator during the processes of FIGS. 12 and 13, machining programs containing the specified machining steps are identified by the process of FIG. 14, and then displayed at the display device 43, whereby machining programs containing any desired machining steps can be easily identified. Accordingly, time required for the preparation of machining programs is shortened.

In the foregoing description, the present invention is applied to an interactive-type numerical control system, but it can be equally applied to other types of numerical control systems, as well as to automatic programming systems for creating machining programs.

Although in the above embodiment, the setting/registering means 2 registers the internal codes, which are to be affixed to the machining program 1a, in the storage means 1 in binary format, it may alternatively be designed to register the codes in the storage means 1 in some other format such as text format.

Further, in the above embodiment, the operator's command entry is effected via the software keys 45 shown in FIG. 2. Alternatively, the command entry may be achieved by selecting "icons," displayed on the display screen 43a as command keys, with a suitable pointing device serving as an input device, such as a mouse.

Furthermore, in the internal table 200 shown in FIG. 4, the left-hand column or the "MACHINING MENU" includes hole cutting, side cutting and pocket cutting, while the middle column or the "DETAILED MENU" includes, under the hole cutting menu, for example, drilling, boring, tapping, reaming and counterboring. The table arrangement is not limited to this alone, and all other machining steps may be included in the machining menus and the detailed menus so that more machining steps can be searched for.

As described above, according to the present invention, the storage means stores at least one machining program and an internal table, the setting/registering means registers the machining program in the storage means while affixing thereto internal codes corresponding to the machining steps, the command input means prompts the operator to enter a search start program number, a search end program number, etc., the searching means searches the machining program for the specified machining steps, and the display control means displays the search data at the display device. Accordingly, machining programs containing any desired machining steps can be easily identified and displayed at the display device, whereby time required to prepare machining programs can be greatly reduced.

We claim:

1. A numerical control system, controlled by an operator through an input device, for displaying a machining step from among machining steps at a display device, said numerical control system comprising:

storage means for storing at least one machining program assigned respective program numbers and including internal codes representing respective ones of the machine steps, and for storing an internal table defining the machining steps corresponding to the respective internal codes;

setting/registering means for creating each machining program interactively in accordance with commands entered by the operator through the input device, and for registering each machining program in said storage means with the internal codes representing ones of the machining steps included in each machining program;

searching means for searching, by using the internal codes and the internal table, the at least one machining program stored in said storage means, for the machining step specified by a search command input by the operator, and, in response, outputting search data; and display control means for displaying the search data associated with the machining step at the display device.

2. The numerical control system according to claim 1, wherein the internal table, in defining each of the machining steps, comprises an associated machining menu indicative of a type of machining to be performed and a corresponding detailed menu indicative of a tool to be used in performing the type of machining of the corresponding machining menu.

3. The numerical control system according to claim 1, wherein said setting/registering means creates each internal table in accordance with commands entered by the operator through the input device, and registers the created internal table in said storage means.

4. The numerical control system according to claim 1, wherein said setting/registering means registers the internal codes in said storage means in binary format.

5. The numerical control system according to claim 1, wherein said setting/registering means registers the internal codes in said storage means in text format.

6. The numerical control system according to claim 1, further comprising:

command input means for requesting the operator to enter a search start program number indicative of a first one of the at least one machining program and a search end program number indicative of a second one of the at least one machining program through the input device when supplied with the search command; and said searching means searching only each machining program stored in said storage means and within a range of the search start program number and the search end program number, for the machining step specified by the search command.

7. A numerical control system, controlled by an operator, for displaying indicators of ones of a plurality of machining programs which have a desired one of a plurality of machining steps, said numerical control system comprising:

storage means for storing the plurality of machining programs which include internal codes representing respective machining steps, and for storing an internal table defining the plurality of machining steps corresponding to the respective internal codes;

setting/registering means for creating each of the plurality of machining programs interactively in accordance with commands entered by the operator, and for registering each of the plurality of machining programs in said storage means with the internal codes;

searching means for searching the machining programs for the desired one of the plurality of machining steps, and, in response, generating search data indicative of the ones of the plurality of machining programs containing the desired one of the plurality of machining steps; and display control means for displaying the indicators based upon the search data.

8. The numerical control system according to claim 7, further comprising:

command input means for requesting the operator to enter a search start program number indicative of a first one of the plurality of machining programs and a search end program number indicative of a second one of the plurality of machining programs, in response to a search command received from the operator; and said searching means searching only ones of the machining programs within a range of the search start program number and search end program number, for the desired one of the plurality of machining steps, and, in response, generating the search data indicative of the ones of the plurality of machining programs containing the desired one of the plurality of machining steps.

* * * * *

UNITED STATES PATENT AND TRADEMARK OFFICE
CERTIFICATE OF CORRECTION

PATENT NO. : 5,457,369
DATED : October 10, 1995
INVENTOR(S) : Teruyuki MATSUMURA et al.

It is certified that error appears in the above-indentified patent and that said Letters Patent is hereby corrected as shown below:

Column 2, line 40, insert a new paragraph with "FIG. 6".

Signed and Sealed this

Nineteenth Day of March, 1996

BRUCE LEHMAN

Attest:

Attesting Officer

Commissioner of Patents and Trademarks